(12) United States Patent
Ooi et al.

(10) Patent No.: US 8,037,309 B2
(45) Date of Patent: Oct. 11, 2011

(54) PORTABLE DATA STORAGE DEVICE WITH ENCRYPTION SYSTEM

(75) Inventors: Chin Shyan Raymond Ooi, Singapore (SG); Lay Chuan Lim, Singapore (SG); Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 603 days.

(21) Appl. No.: 10/526,169

(22) PCT Filed: Apr. 26, 2004

(86) PCT No.: PCT/SG2004/000109

§ 371 (c)(1),
(2), (4) Date: Nov. 17, 2005

(87) PCT Pub. No.: WO2005/103912

PCT Pub. Date: Mar. 11, 2005

(65) Prior Publication Data

US 2006/0105748 A1     May 18, 2006

(51) Int. Cl.
*H04L 9/32* (2006.01)
*H04L 29/06* (2006.01)
(52) U.S. Cl. ........ 713/176; 713/160; 713/161; 713/168; 709/217; 709/219; 709/229; 705/64; 705/75
(58) Field of Classification Search .................. 713/176, 713/168, 160, 161; 709/217, 219, 229; 705/64, 705/75
See application file for complete search history.

(56) References Cited

U.S. PATENT DOCUMENTS

| 4,887,296 | A | * | 12/1989 | Horne | 380/239 |
| 5,046,094 | A | | 9/1991 | Kawamura et al. | |
| 5,636,280 | A | * | 6/1997 | Kelly | 713/155 |
| 5,917,913 | A | | 6/1999 | Wang | |
| 6,003,135 | A | | 12/1999 | Bialick et al. | |
| 6,044,154 | A | * | 3/2000 | Kelly | 713/155 |

(Continued)

FOREIGN PATENT DOCUMENTS

EP     1 037 131 A2    9/2000

(Continued)

OTHER PUBLICATIONS

Sandisk: "USB CompactFlash/DE Card/MMC Test Commands," online User's Guide, www.sandisk.com, Version 1.1, SDSDEV-01, Doc. No. 80-36-00279, XP-002330514, Oct. 2003. SanDisk Corporation, Sunnyvale, California, 94089.

(Continued)

*Primary Examiner* — Nathan Flynn
*Assistant Examiner* — Sarah Su
(74) *Attorney, Agent, or Firm* — Blakely, Sokoloff, Taylor & Zafman LLP

(57) ABSTRACT

A portable data storage device has a non-volatile memory 3 for storing user data, an interface section 7 for receiving and transmitting data to a host, and a master control unit 1 for transferring data to and from the non-volatile memory 3. The portable data storage device further includes an integrated circuit 13 for generating a public/private key pair. The portable data storage device is arranged to transmit at least one of the keys out of the device. In different embodiments, the host can verify that the data it receives is correct, and the device can verify that the host has received the correct data.

22 Claims, 3 Drawing Sheets

U.S. PATENT DOCUMENTS

| | | | |
|---|---|---|---|
| 6,460,138 B1 * | 10/2002 | Morris | 713/184 |
| 6,536,941 B1 * | 3/2003 | Fang | 368/281 |
| 6,763,460 B1 * | 7/2004 | Hild et al. | 713/161 |
| 6,996,723 B1 * | 2/2006 | Kyojima et al. | 713/193 |
| 7,404,084 B2 * | 7/2008 | Fransdonk | 713/176 |
| 7,434,051 B1 * | 10/2008 | Montenegro et al. | 713/170 |
| 2001/0020274 A1 * | 9/2001 | Shambroom | 713/201 |
| 2002/0032862 A1 * | 3/2002 | Harrison et al. | 713/173 |
| 2003/0158961 A1 | 8/2003 | Nomura et al. | |
| 2003/0161468 A1 * | 8/2003 | Iwagaki et al. | 380/201 |
| 2003/0217165 A1 | 11/2003 | Buch et al. | |
| 2003/0217206 A1 | 11/2003 | Poo | |
| 2004/0030901 A1 | 2/2004 | Wheeler et al. | |
| 2004/0054906 A1 * | 3/2004 | Carro | 713/171 |
| 2005/0027987 A1 * | 2/2005 | Neufeld et al. | 713/176 |
| 2006/0083370 A1 * | 4/2006 | Hwang | 380/28 |

FOREIGN PATENT DOCUMENTS

| | | |
|---|---|---|
| GB | 2377525 A | 1/2003 |
| GB | 2393007 A | 3/2004 |
| GB | 2404263 A | 1/2005 |
| JP | 2-204768 | 8/1990 |
| JP | 2002-258745 | 9/2002 |
| JP | 2003-249919 | 9/2003 |
| JP | 2004-038445 | 2/2004 |
| WO | WO 00/65602 | 11/2000 |
| WO | WO 01/61692 A1 | 8/2001 |
| WO | WO 02/46904 A1 | 6/2002 |
| WO | WO 02/073877 A2 | 9/2002 |
| WO | WO 03/003141 A2 | 1/2003 |
| WO | WO 03/003141 A3 | 1/2003 |
| WO | WO 03/003282 A1 | 1/2003 |
| WO | WO 03/003283 A1 | 1/2003 |
| WO | WO 03/102788 A1 | 12/2003 |
| WO | WO 2004/015579 A1 | 2/2004 |

OTHER PUBLICATIONS

PCT International Search Report, International Application No. PCT/SG2004/000109; International Filing Date, Apr. 26, 2004; mailing date, Jan. 24, 2005 (5 pp.).

Patent Specification for SG 200400358-8, Trek 2000 International Ltd., filed prior to Apr. 26, 2004, 26 pages.

Patent Specification for PCT-SG03-00152, Trek 2000 International Ltd., filed prior to Apr. 26, 2004, 22 pages.

International Preliminary Examination Report for PCT/SG2004/000109, dated Mar. 23, 2006, 4 pages.

European Search Report for EP05250799, dated Jun. 3, 2005, 5 pages.

Notification for Reasons for Rejection for Japanese Patent Application No. 2005-045651, dated Jun. 8, 2005, 3 pages.

Great Britain Search Report for GB0502896.4, dated Mar. 21, 2005, 3 pages.

* cited by examiner

PORTABLE DATA STORAGE DEVICE WITH ENCRYPTION SYSTEM

CROSS-REFERENCE TO OTHER APPLICATIONS

This is a National Phase of International Application No. PCT/SG2004/000109, filed on Apr. 26, 2004.

FIELD OF THE INVENTION

The present invention relates to a portable data storage device of the kind having a non-volatile solid state memory. In particular it relates to such a device having encryption capability.

BACKGROUND OF THE INVENTION

Recently there has been much development in the area of portable data storage devices having non-volatile solid state memory units, such as flash memories. A seminal patent application in this area, PCT/SG00/00029, "Portable Data Storage Device", describes a memory device which can be directly plugged into the socket of a computer using an integral male USB plug. The size of the device is such that it is capable, for example, of being fully enclosed within a closed fist, and is in this sense portable. It is able to receive data from one computer system, and transfer it to another computer system, just like a magnetic disk or CD-RW disk.

Many improvements of this scheme have been proposed. For example, PCT/SG02/00047, describes a portable data storage device in which access to the data in the non-volatile memory device is only permitted to users whose identities have been verified by an integral biometrics sensor, such as a fingerprint sensor.

PCT/SG02/00086 describes that a portable data storage device can include an engine for compressing data and decompressing data, so that the effective data storage capacity of the device (i.e. the amount of typical user data which the device can receive and regenerate) is greater than the nominal capacity of the non-volatile memory device.

Singapore patent application no. 200400358-8 describes a portable data storage device which is adapted for storage of data describing video images, such that the device can be used to a video generation system to play video.

PCT/SG01/00136 describes a portable data storage device which is arranged for wireless communication with a host, e.g. by radio, for receiving data and subsequently regenerating it. The device is thus capable of transferring data between computer systems which are capable of this wireless data transmission. PCT/SG03/00152 describes an enhancement of this system in which the data storage device includes a pointer, so that a user can move it to act as a convenient data input device.

PCT/SG03/00033 describes a portable data storage device which is arranged to receive data securely from an information provider or the Internet. This may use a public key associated with the user and pre-stored in the device.

The disclosure of all of the above references is incorporated herein in its entirety.

SUMMARY OF THE INVENTION

While many of these documents provide a convenient portable data storage device, there remain concerns about security. For example, if the device falls into the hands of a person with equipment for measuring and modifying electrical signals being transmitted between the device and the host, there is concern that data transmitted out of the device could be modified before it reaches the host.

The present invention aims to provide a new and useful portable data storage device, and in particular one which may be able at partially to alleviate this problem.

In general terms, the invention proposes a portable data storage device having a non-volatile memory for storing user data, an interface section for receiving and transmitting data to a host, and a master control unit for transferring data to and from the non-volatile memory. Upon a command from a host requesting data, the device transmits the requested data stored in its memory to the host using the interface section. The device further includes an integrated circuit means for generating at least one key, and that the portable data storage device is arranged to transmit the key to the host.

In a first application of the invention, the generated key is transmitted in an encrypted form. The generated key is encrypted using a secret key which is not generated by the integrated circuit means but permanently stored in the portable storage device. The portable storage device transmits the encrypted generated key to the host. The host is additionally arranged to store the secret key, and use it to decrypt the encrypted generated key. It then uses the generated key and the requested data to generate a digital signature. The digital signature is transmitted to the portable storage device which verifies that it was generated using the data. Thus, the device is able to verify the integrity of the data received by the host.

No third party is able to interfere with this process (e.g. by controlling the signals transmitted out of the portable memory device, or signals transmitted into it) since without access to the secret key he cannot regenerate the private key, and without access to the private key he has no means of generating the digital signature. The fact that the private key is different each time the data is transmitted means, for example, that the digital signature transmitted from the host to the portable data storage device following a first transmission of the data cannot just be recorded and transmitted subsequently to the portable storage device, since it only has validity once.

Optionally, the generation of the digital signature using the data and the private key includes first hashing the data to generate a hash result, and encrypting the hash result using the generated key.

Optionally, the data can be transmitted from the portable data storage device in an encrypted form. Conveniently, it is encrypted using the generated key and/or the secret key, but alternatively (or additionally) it may be encrypted in some independent way.

Typically, the generated key is the private key of a public key/private key pair. The verification of the digital signature may optionally be performed in the device using the public key.

In a second application of the invention, the portable data storage device is capable of generating two keys: a public key and a private key. In this case, the device generates a digital signature using the requested data and the private key, and transmits the digital signature and the public key out of the device. The host uses the public key to verify that the requested data it receives is the same data which the device used to generate the digital signature.

Optionally, the requested data extracted from the memory may be supplemented with other data (such as biometric data obtained from a biometric sensor of the device).

Embodiments of the present invention may incorporate any one or more of the features of the data storage devices described in the "background" section of this application.

In particular, they preferably-include a biometric sensor and verification engine (possibly a portion of the master control unit) for granting access to data stored in the device based on a biometric verification of the user's identity. Optionally, biometric data received from the biometric sensor may be included in data transmitted out of the device (preferably in encrypted form). Optionally, the fingerprint may be generated from data including the biometric data.

Furthermore, the device preferably includes a compression algorithm for exploiting any redundancy in data received by the device to compress it before storing it in the non-volatile memory, and a decompression engine to regenerate the data before it is transmitted from the device.

Furthermore, the interface section of the device may be a USB connection, e.g. using a USB plug integral with the memory device (which itself is formed as one physical unit), or a wireless data connection.

The housing of the device may have any physical shape, such as one including a narrowed end for use as a pointer.

The device may further include a camera for generating image data, and/or a microphone for capturing audio sound. The image and/or audio data may be stored in the memory, prior to being transferred to the host.

The invention may be expressed either as a data storage device (e.g. in combination with a host), or as a method performed jointly by a data storage device and host.

BRIEF DESCRIPTION OF THE FIGURES

Preferred features of the invention will now be described, for the sake of illustration only, with reference to the following figures in which.

DETAILED DESCRIPTION OF THE EMBODIMENTS

Figure 1:
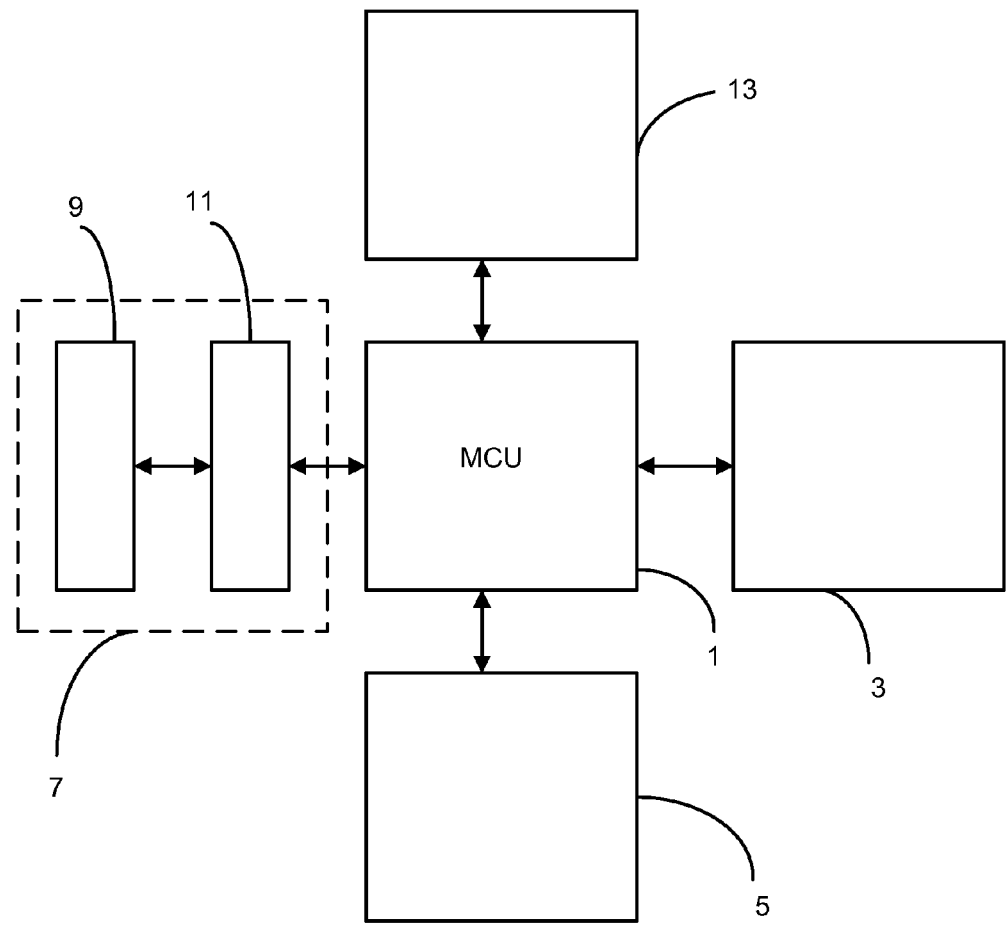
FIG. 1 shows the overall construction of a device which is an embodiment of the invention.

FIG. 1 shows the general form of a portable data storage device which is an embodiment of the invention. The device is typically formed as an integral unit within a housing. It comprises a master control unit 1, a non-volatile memory unit 3 (typically, a flash memory comprising one or more flash memory units), and a biometric sensor 5 such as a fingerprint sensor. It further comprises a data transmission/reception section 7, for communication with an external host (such as a personal computer, or other computing system).

The data transmission/reception section 7 may take many forms. In one form, it comprises a USB connector 9 (such as a USB plug) and a USB interface device 11 between the USB connector 9 and the master control unit 1. Preferably, the interface device 11 and connector 9 operate according to the USB 2.0 standard, or any faster standard which may be developed in the future. The USB connector 9 may for example be a male USB plug integrally formed with the rest of the memory device of FIG. 1, for direct insertion (i.e. without a cable in between) into a female socket of the host. More generally, the connector 9 may be any other form of male connector for insertion into a socket, such as a Firewire plug.

Alternatively, the section 7 may be provided as a section for wireless data transmission/reception to the host (e.g. without physical contact of the memory device and the host). In this case, the plug 9 is replaced by an antenna, and the interface device 11 is replaced by a device for using the antenna for wireless transmission/reception of data. For example, these two units may function together to provide an interface according to a wireless standard, such as WLAN or Bluetooth.

In any case, the master control unit 1 is arranged to receive data packets from the section 7. These data packets may include commands, and also may include data (possibly in an encrypted form as described below). According to the commands, the master control unit 1 stores the data in the memory 3. The location within the memory 3 in which the data is stored is determined by the master control unit 1 in accordance with commands. Furthermore, according to commands received by the master control unit 1, the unit 1 may instruct the memory 3 to transmit data stored in it to the master control unit 1, which may use at least some of the data to generate packets including the data (preferably in an encrypted form, as described below), and transmit them out of the device through the section 7.

The memory 3 preferably has a data storage capacity of at least 32 MB or at least 64 MB, and more preferably higher, such as at least 128 MB, at least 256 MB, at least 512 MB, or at least 1 GB.

The master control unit is normally a programmable integrated circuit which operates based on software it downloads (normally during start-up) from a ROM memory (not shown) of the device, and/or possibly from the non-volatile memory 3.

As described in PCT/SG02/00047, the biometric sensor 5 receives biometric data (e.g. a fingerprint) from an individual who is a user of the device, and identifying that individual. The MCU 1 may only operate if the biometric data matches pre-stored data located within the device, such as stored in the memory 3.

The device further includes an integrated circuit means 13 (which may, as shown, be a single integrated circuit ("smartcard"), or which in some embodiments of the invention be implemented using multiple physically separate integrated circuits co-operating to function as a single integrated circuit) for generating a pair of asymmetrical PKI (public key infrastructure) encryption keys: a private key (denoted here as K) and a public key (denoted here as Z). It does this on the instructions of the master control unit 1, and transmits the keys generated to the master control unit.

The integrated circuit 13 may be a known "smartcard"; that is, it may be according to designs which are known in the field of credit card security for example. The various security features of such cards may be present in the integrated circuit 13, For example, the integrated circuit 13 is preferably implemented in a tamper-proof fashion, such that any attempt to interfere with it (e.g. to access a secret key stored within it, or to influence the generation of the keys) is liable to make the integrated circuit 13 (and hence the device) inoperative.

Normally, the integrated circuit 13 includes a random number generator unit, such that the pair of keys will be different each time they are generated according to the differing random output of the random number generator.

The device further stores within it a predetermined "secret key", denoted here as "i". This may be stored for example, in the memory 3. Alternatively, it may be stored in the integrated circuit 13. At any rate, the key is preferably stored such that it is very difficult to extract from the device without making the device inoperative.

We now turn to describing four modes of operation of the device. Note that certain devices which are embodiments of the invention will be capable of performing all these modes of operation, while other devices which are embodiments of the invention are only capable of performing one of them.

Note that these modes of operation are described, for the sake of simplicity, without reference to the concept mentioned above of verifying user identity using the biometric sensor 5. However, it is to be understood that any of the processes described above may optionally include steps (e.g. after data is requested from the device) in which biometric data is input to the biometric sensor 5, and the identity of that data with biometric data pre-stored in the device is checked, before the device performs any further steps of the process.

1. Verification by Device of Data Received by the Host

In this mode of operation, the device is able to transmit data to a host which has access (e.g. within itself or its own resources) to the secret key, and to verify that the host has received the data correctly.

Figure 2:
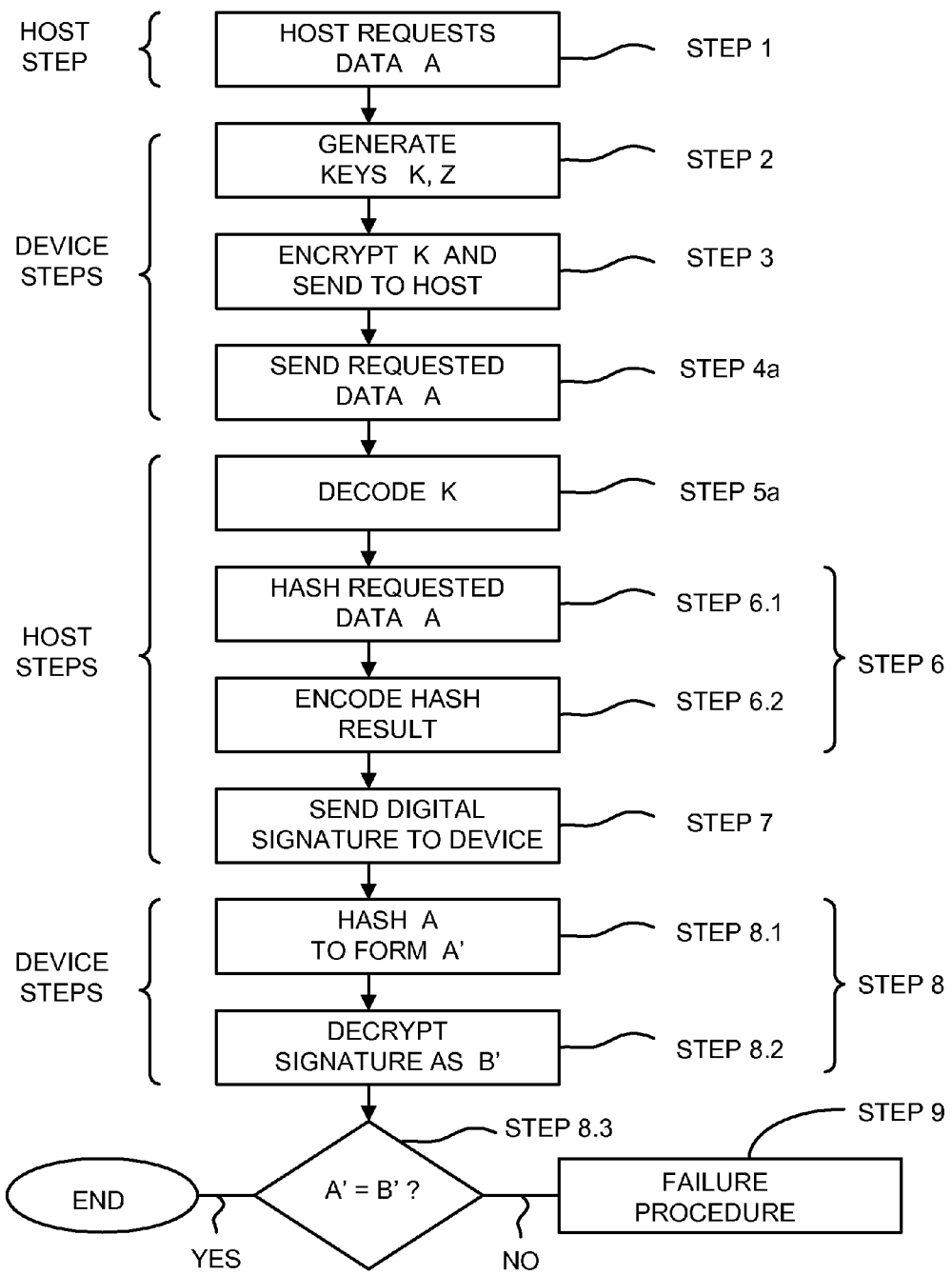
FIG. 2 shows the steps of a first method performed by the device of FIG. 1.

The steps of this procedure are as follows, and as shown in FIG. 2.

In a first step, the host signals to the device that it wishes to receive data ("requested data", denoted here as A) stored in the memory 3 (step 1). In response, the MCU 1 instructs the integrated circuit 3 to generate a public key Z and a private key K (step 2).

The MCU 1 then encrypts the private key K using the secret key i and transmits the encrypted private key K to the host (step 3). The device further transmits the data requested by the host (step 4a). Note that this requested data may optionally be encoded by the MCU before it is transmitted to the host, e.g. using the public key Z. This can be done in various ways, such as by a symmetric encryption (e.g. using i), or using the private key K. One preferred possibility is to generate second set of public/private keys, transmit the second private key to the host encoded (e.g. using i) such that the host can decode it, and then transmitting the data encoded using the second public key such that the host can decrypt it using the second private key.

Note that the secret key i is not transmitted out of the device.

In step 5a, the host decodes the private key K using the secret key i it already knew. In the case that the requested data was encrypted using the public key Z, the host decodes it using K.

In step 6, the host uses the decrypted private key K and the requested data set to generate a digital signature. Preferably this is done by the sub-steps of generating a hashed version of the requested data (step 6.1) to produce a hash result (denoted here as A'), and using the private key K to encode the hash result (step 6.2) as a digital signature.

In step 7, the digital signature is transmitted by the host to the device.

In step 8, the device (normally the MCU 1) verifies the digital signature using the requested data A. One way of doing this is for the device to hash A to produce A' (step 8.1), and decrypt the digital signature using the public key Z to produce a result called B' (step 8.2), and verify that A' is equal to B' (step 8.3).

(An alternative way to verify the digital signature would be for the device to use the requested data A and the private key K to produce its own version of the digital signature, and verify that this is identical with the digital signature received from the host). Note that in this variant the public key Z is never used. This mean that the invention can be performed even if the private key K is not part of a public/private key pair, but rather is a key used for symmetric encryption.

If there is no match, then the host has not correctly received the data and/or the private key, and the device then implements (step 9) an appropriate transmission failure procedure, which may include sending a warning message to the host, and/or disabling its own operation, at least for a predetermined time.

Note that the order of some of the steps in FIG. 2 can be changed without altering the overall operation significantly.

For example, step 8.1 may optionally be performed as soon as the requested data enters the device, and the hash result A' may be stored in the memory 3. This means that the hashing operation only has to be performed once, rather than whenever the data A is requested.

2. Verification by the Host of Data Received from the Device

In this mode of operation, the device is able to transmit data to a host (not necessarily one having access to the secret key), and the host is able to verify that it has received the data correctly.

Figure 3:
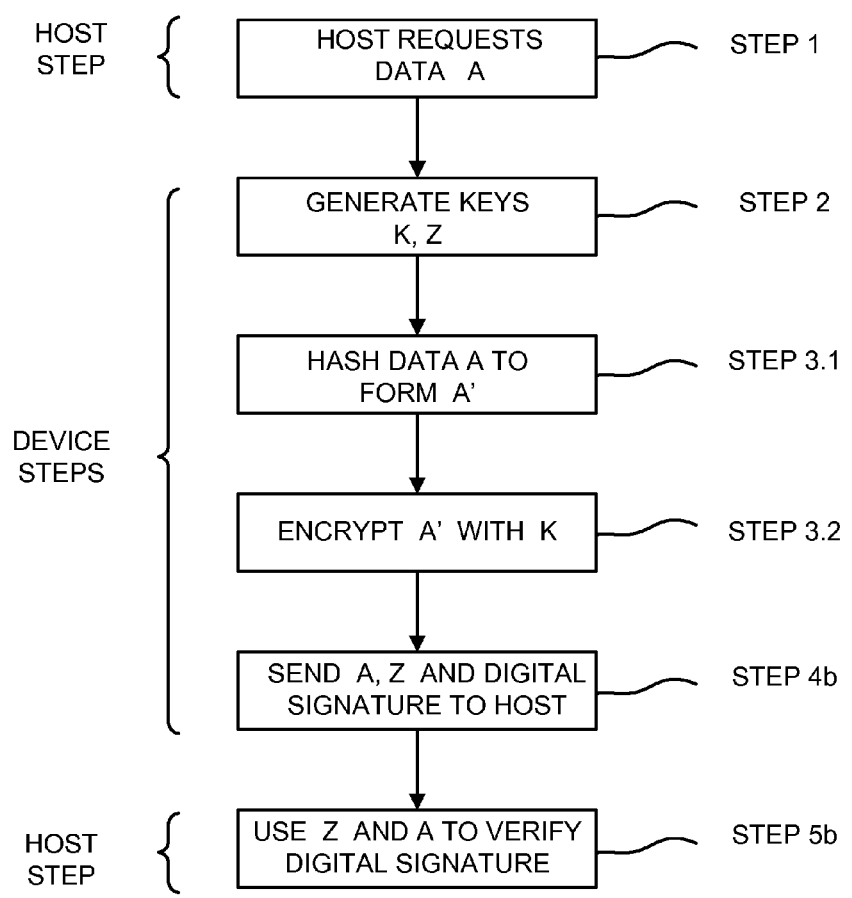
FIG. 3 shows the steps of a second method performed by the device of FIG. 1.

The steps of this procedure are as follows, and as shown in FIG. 3.

In a first step, the host signals to the device that it wishes to receive data ("requested data", denoted by A) stored in the memory 3 (step 1). In response, the MCU 1 instructs the integrated circuit 3 to generate a public key Z and a private key K (step 2).

In step 3, the device (normally the MCU 1) generates a digital signature using the requested data A. It may do this by the sub-steps of hashing the requested data A to form a hash result A' (step 3.1), and then encrypting it with the private key K (step 3.2). The host then transmits the data, the digital signature and the public key Z to the host (step 4b).

The host uses the pubic key and the requested data A to verify that the requested data A matches the digital signature (step 5b). For example, it can do this by using the requested data A to generate a hash result B', and decrypting the digital signature using the public key Z to form a result C'. If B' is equal to C', then this indicates that the data is correctly received. A hacker will not be able to fool the host unless he can modify A while keeping still keeping it such that it is still consistent with the digital signature (and still meeting any other predetermined characteristics—e.g. if A is a file which is intended to operate with an application, the host will be able to detect the modification if the file it receives is not compatible with that application), which in general is an extremely difficult computational task. Most modifications of A which keep its hash value will change its characteristics in other ways, e.g. make it meaningless in the context for which it is intended.

To make this yet more difficult, optionally the public key and the file A may be transmitted separately, e.g. at times spaced apart by at least a predetermined interval.

3. Enhanced Version of the Second Mode of Operation of the Device

A variation of the second mode of operation of the device has the additional features that the host generates a public key I and private key Z. Specifically, the sequences of steps may be as follows:

1. The device generates a public Key X and a private Key Y
2. The host generates a public Key I and private Key Z.
3. The device send the public Key X to host
4. The host send the public Key I to device
5. The device hashes the message A to A'
6. The device encrypts A' using private Key Y to produce digital signature
7. The device again encrypt both the data A and the digital signature with the public key I, and sends the encrypted data A and the digital signature to the host.

When the host receives this data it performs the following steps:
1. The host will decrypt the digital signature with private Key Z to produce A and the digital signature. (Only the host can do this decrypt, since only it has private Key Z)
2. The host will Hash the data with the message.
3. The host will decrypt the digital signature with public Key X, if the result is a match then the data has not been altered.

Therefore no hacker can hack the message since they cannot even access the original message A. Furthermore, this scheme provides an additional level of security compared a scheme in which the generation of the keys X and Y is omitted.

4. Biometric digital signatures

Another possible refinement of the second mode of operation of the device is that the data A may be supplemented with data which is not necessarily taken from the memory 3. In particular, it may be supplemented with biometric data received by the biometric sensor 5. Thus, this data too may be securely transmitted to the host (in the sense that the host can verify that is has received exactly the biometric data transmitted by the device), and the host can verify that it matches biodata to which the host has access.

This is particularly convenient because it means that the host can verify both that the message transmitted is what the device sent, and also that the individual who sent the message is the individual with whom the host expected to transact.

We now turn to two optional modes of operation which may be present in some embodiments of the invention, but which do not employ the generation of private/public keys in the device.

1. Verification of Identity of Host

In this case, the device is provided with a pre-stored public key associated with an authority (e.g. the manufacturer of the device). The public key is part of a public key/private key pair associated with the authority, but the device does not know the private key. Upon connecting the device to a host, the device receives from the host a data set produced using the private key of the authority. The device is arranged to use the authority's public key to verify that the data set was produced using the authority's private key (this can be done using known techniques). Only once this is done will the device operate under the control of the host. For example, the device may contain an admin area of the memory 1, and may only modify the admin area upon instructions received from a host of verified identity.

2. Verification of Identify of the User

In this case, the device is provided with a pre-stored private key associated with a user. The public key is part of a public key/private key pair associated with the user. Upon connecting the device to a host, the device transmits to the host a data set produced using the private key of the user. The host is arranged have access to the user's public key, and to use the user's public key to verify that the data set was produced using the user's private key (this can be done using known techniques). Only once this is done the host will operate under the control of the device. For example, the host may be a computer arranged to perform a transaction such as a financial transaction, and the host may only perform the transaction under the control of a device of which the identity is verified as described above.

Although only a single embodiment of the invention has been described many variations are possible within the scope of the invention as will be clear to a skilled reader.

For example, whereas in FIG. 2 and FIG. 3, the public/private keys are generated together during the method steps, in principle the integrated circuit 13 could generate public/private key pairs in advance, and the MCU 1 could store them for example in the memory 3 until required. This would mean that the MCU 1 would be able to access them as required from the memory, rather than generate them as part of the sequence of steps of FIG. 2 or FIG. 3.

The invention claimed is:

1. A portable data storage device comprising:
   a non-volatile memory to store data;
   an interface section to receive a command from and transmit the data to a host, wherein the interface section includes a USB plug integral with the portable data storage device and a USB interface device;
   a master control unit to transfer the data from the non-volatile memory, wherein the master control unit is a programmable integrated circuit that operates based upon software downloaded from the non-volatile memory; and
   an integrated circuit to generate at least one key,
   wherein the portable data storage device is arranged, upon receiving the command from the host requesting the data stored in the non-volatile memory, the data stored prior to receiving the command, to generate the at least one key, to encrypt the generated key using a secret key that is permanently stored in the portable storage device, and to transmit the encrypted key and the requested data stored in the non-volatile memory to the host using the interface section, wherein the secret key is permanently stored within the portable storage device prior to the generating at least one key, and
   wherein the portable data storage device is further arranged to receive from the host a digital signature that is generated using the at least one generated key and the requested data transmitted to the host from the portable storage device, and the portable storage device is further arranged to use the received digital signature to verify that the requested data has been correctly received by the host.

2. The portable data storage device according to claim 1 wherein the digital signature is produced by hashing the received data to generate a hash result, and encrypting the hash result using the generated key.

3. The portable data storage device according to claim 1 wherein the generated key is one key of a public key/private key pair.

4. The portable data storage device according to claim 3 wherein the verification of the digital signature is performed in the portable data storage device using the public key.

5. The portable data storage device according to claim 1 wherein the requested data includes both data present in the non-volatile memory, and also biometric data obtained from a biometric sensor of the portable data storage device.

6. The portable data storage device according to claim 1 arranged to transmit the requested data in an encrypted form.

7. The portable data storage device according to claim 1, further comprising:
   a biometric sensor; and
   a verification engine for granting access to data stored in the portable data storage device based on a biometric verification of the user's identity by comparison of biometric data received using the biometric sensor with pre-stored biometric data.

8. The portable data storage device according to claim 1 including a compression algorithm for exploiting any redundancy in data received by the portable data storage device to compress it before storing it in the non-volatile memory, and a decompression engine to regenerate the data before it is transmitted from the portable data storage device.

9. The portable data storage device according to claim 1 in which the interface section is for wireless communication with the host.

10. The portable data storage device according to claim 1 having a housing, the housing including a narrowed end for use as a pointer.

11. The portable data storage device according to claim 1, further including a camera for generating image data, and/or a microphone for capturing audio data, the master control unit being arranged to store the image data and/or the audio data in the memory.

12. A system comprising:
a portable data storage device including
a non-volatile memory to store data,
an interface section to receive a command from and transmit the data to a host, wherein the interface section includes a USB plug integral with the portable data storage device and a USB interface device,
a master control unit to transfer the data to and from the non-volatile memory, wherein the master control unit is a programmable integrated circuit that operates based upon software downloaded from the non-volatile memory, and
integrated circuit for generating at least one key,
the portable data storage device being arranged, upon receiving the command from the host requesting the data stored in the non-volatile memory, the data stored prior to receiving the command, to generate the at least one key, to encrypt the generated key using a secret key that is permanently stored in the portable storage device and to transmit the encrypted key and the requested data stored in the non-volatile memory to the host using the interface section, wherein the secret key is permanently stored within the portable storage device prior to the generating at least one key,
wherein the portable data storage device is further arranged to receive from the host a digital signature that is generated using the at least one generated key and the requested data transmitted to the host from the portable storage device, and the portable storage device is further arranged to use the received digital signature to verify that the requested data has been correctly received by the host; and
a host computer, the host computer being arranged to transmit the command to the portable data storage device using the interface section to request the data.

13. The system according to claim 12 wherein the generated key is one key of a public key/private key pair, and the host is arranged to generate a digital signature using the private key and the requested data.

14. A method of transferring data from a portable data storage device to a host, the host and the portable data storage device each having a permanently stored secret key, the portable data storage device including a master control unit and non-volatile memory, the master control unit being a programmable integrated circuit that operates based upon software downloaded from the non-volatile memory, the method comprising the steps of:

the portable data storage device receiving an instruction from the host requesting the data stored in a non-volatile memory of the portable data storage device, wherein the data is stored prior to receiving the instruction;
the portable data storage device generating at least one key;
the portable data storage device encrypting the generated key using the secret key permanently stored in the portable data storage device, wherein the secret key is permanently stored within the portable storage device prior to the generating at least one key;
the portable data storage device obtaining the requested data from the non-volatile memory and the portable data storage device transmitting to the host the requested data and the encrypted key;
the host decrypting the encrypted key using the secret key permanently stored in the host;
the host generating a digital signature that is generated using the decrypted key and the requested data;
the host transmitting the digital signature from the host to the portable data storage device; and
the portable data storage device using the digital signature to verify that the requested data has been correctly received by the host.

15. The method according to claim 14 wherein the host generates the digital signature using a private key and the requested data.

16. The method according to claim 14 in which the digital signature is produced by hashing the received data to generate a hash result, and encrypting the hash result using the generated key.

17. The method according to claim 14 in which the generated key is a private key of a public key/private key pair.

18. The method according to claim 17 in which the verification of the digital signature is performed in the portable data storage device using the public key.

19. The method according to claim 14 in which the requested data includes both data present in the memory, and also biometric data obtained from a biometric sensor of the portable data storage device.

20. The method according to claim 14, in which the requested data is transmitted from the portable data storage device to the host in an encrypted form.

21. The method according to claim 14, further comprising verifying a user's identity by comparison of biometric data received using a biometric sensor with pre-stored biometric data, and upon this verification for granting access to the data stored in the portable data storage device.

22. The method according to claim 14, including:
the portable data storage device receiving data from the host, the portable data storage device exploiting any redundancy in the data to compress it, and the portable data storage device storing the data in the non-volatile memory; and
upon the data being requested by the host, regenerating the data and transmitting it from the portable data storage device.

* * * * *